G. Herritfelder.

Garbage Sink.

N° 510.
31,614.

Patented Feb. 19, 1861.

Witnesses:
Lemuel W. Serrell
Chas. H. Smith

Inventor:
George Herrtfelder

THE GRAPHIC CO.PHOTO-LITH.39 & 41 PARK PLACE,N.Y.

UNITED STATES PATENT OFFICE.

GEORGE HERDTFELDER, OF NEW YORK, N. Y., ASSIGNOR TO HIMSELF AND C. LAMMRICH, OF SAME PLACE.

UNDERGROUND RECEPTACLE FOR WASTE MATTER.

Specification of Letters Patent No. 31,514, dated February 19, 1861.

*To all whom it may concern:*

Be it known that I, GEORGE HERDTFELDER, of the city and State of New York, have invented an Improved Receptacle for Ashes, Garbage, &c.; and I do hereby declare that the following is a full, clear, and exact description of the nature of my said invention, reference being had to the annexed drawing, making part of this specification, wherein—

Figure 2:
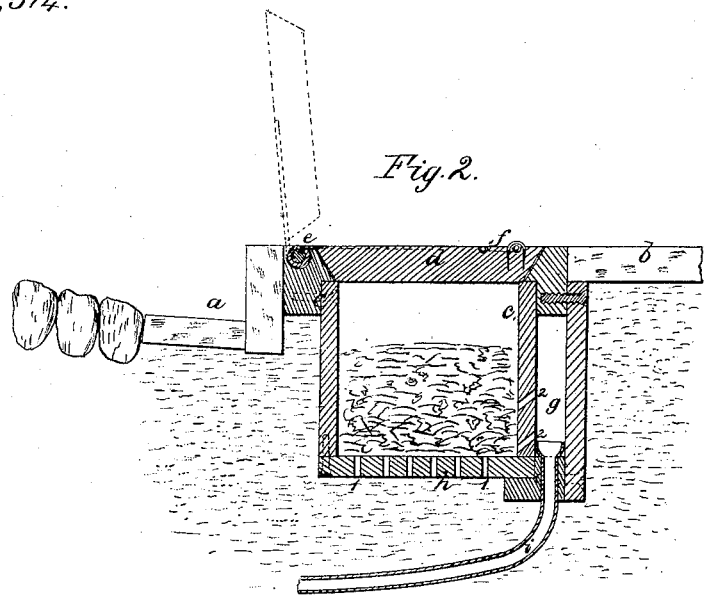
Figure 1:
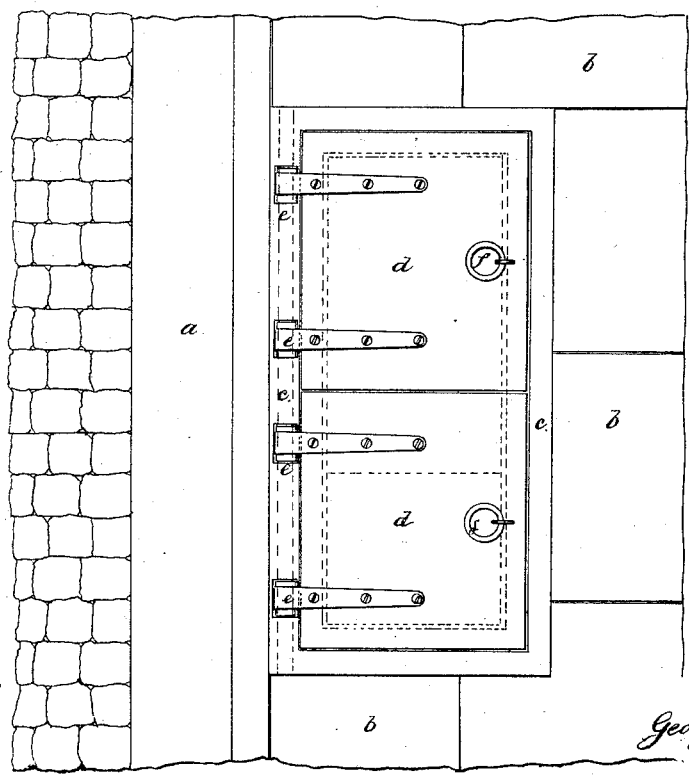

Figure 1 is a plan of my said receptacle, and Fig. 2 is a vertical cross section of the same.

Similar marks of reference indicate the same parts.

In cities it is usual to have the ashes and garbage collected and conveyed away in carts; hence receptacles are required for such matter *ad interim*. Barrels and boxes have been employed for this purpose but they are not only unsightly but encumber the street and sidewalk. The inconvenience resulting from the want of a suitable ash and garbage receptacle is especially felt in crowded portions of cities, where often several hundred people reside in one house, and the accumulation of effete matter is considerable.

My said invention meets every want and is at the same time no obstruction to the thoroughfare. The same consists of a box sunk into the ground, level with the surface of the street or sidewalk and provided with covers sufficiently strong for the sustaining of persons or bodies passing. And to this box I apply a drain or pipe to convey away, either into the soil or a sewer, the liquid matter that may be thrown into said receptacle. This box, located at the edge of the sidewalk, can be emptied of its contents by shoveling the same into a cart backed or drawn up for this purpose.

In the drawing $a$, represents a portion of the street and gutter, $b$, the sidewalk. $c$, is my receptacle formed of wood or metal although I prefer the latter, and may be in one or several pieces. This box is to be sunk in the earth so that the upper edge is level with the sidewalk, and one of the ends should be inclined to give facility in shoveling out. The bottom $h$, is represented as perforated with holes 1, 1, to allow any water to drain off into the soil as far as possible.

$d$, $d$, are covers hinged, at $e$, $e$, to the box $c$, and provided with rings $f$, $f$, by which to lift them. These covers $d$, $d$, shut level with the sidewalk and are made sufficiently strong to sustain passing bodies.

Dirty water is often thrown into receptacles with ashes and garbage. I therefore provide holes 2, 2, sloping upward to prevent solid matter passing in, and $g$ is a chamber on the side of the box $c$, receiving any such liquid from which a pipe $i$ conveys the same to a sewer or cesspool. This pipe $i$, may have a bend or trap to keep smell from passing through from the sewer. This box may be made of flag stones with metal or wooden top edge and covers; or other suitable material may be employed for said box.

What I claim and desire to secure by Letters Patent is—

The receptacle for ashes, garbage, &c., formed of the box $c$, and covers $f$, in combination with the chamber $g$ and pipe $i$ for the purposes and as specified.

In witness whereof I have hereunto set my signature this third day of January 1861.

GEORGE HERDTFELDER.

Witnesses:
LEMUEL W. SERRELL,
CHAS. H. SMITH.